US011267273B2

(12) United States Patent
Tanaka

(10) Patent No.: US 11,267,273 B2
(45) Date of Patent: Mar. 8, 2022

(54) PRINTING SYSTEM AND PRINTING METHOD

(71) Applicant: SEIKO EPSON CORPORATION, Tokyo (JP)

(72) Inventor: Katsuyuki Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/133,841

(22) Filed: Dec. 24, 2020

(65) Prior Publication Data
US 2021/0197600 A1 Jul. 1, 2021

(30) Foreign Application Priority Data
Dec. 27, 2019 (JP) .............................. JP2019-237730

(51) Int. Cl.
B41J 29/38 (2006.01)
B41J 2/02 (2006.01)
H04N 1/00 (2006.01)
G06F 3/12 (2006.01)

(52) U.S. Cl.
CPC ................. B41J 29/38 (2013.01); B41J 2/02 (2013.01); G06F 3/12 (2013.01); H04N 1/00238 (2013.01); H04N 1/00344 (2013.01)

(58) Field of Classification Search
None
See application file for complete search history.

(56) References Cited

U.S. PATENT DOCUMENTS

| 2001/0038468 | A1* | 11/2001 | Hiramatsu | ............. H04N 1/603 358/518 |
| 2007/0291312 | A1* | 12/2007 | Kaneko | ................ H04N 1/6033 358/2.1 |
| 2012/0229824 | A1* | 9/2012 | Okuda | ................. H04N 1/6052 358/1.9 |
| 2019/0174024 | A1* | 6/2019 | Fukasawa | ............ H04N 1/6019 |

FOREIGN PATENT DOCUMENTS

| JP | 2004-220164 A | 8/2004 |
| JP | 2009-178942 A | 8/2009 |

* cited by examiner

Primary Examiner — Dov Popovici
(74) Attorney, Agent, or Firm — Global IP Counselors, LLP

(57) ABSTRACT

A common profile is prepared that, in a device-independent first color system, converts image data of a color space that is representable by the first color system into image data of a color space that is commonly representable by the plurality of printing devices, and first image data representing an image to be printed is converted into second image data by using the common profile, where the image is represented by the first color system. Then, the second image data is converted into third image data by using an output profile, where the third image data is image data of a second color system that depends on a specific printing device designated from among a plurality of printing devices and the output profile is unique to the designated specific printing device. The third image data thus obtained is output to the designated specific printing device and printed.

8 Claims, 16 Drawing Sheets

● NOT INCLUDED IN ALL
○ INCLUDED IN ALL

● NOT INCLUDED IN ALL
○ INCLUDED IN ALL

PRINTING SYSTEM AND PRINTING METHOD

The present application is based on, and claims priority from JP Application Serial Number 2019-237730, filed Dec. 27, 2019, the disclosure of which is hereby incorporated by reference herein in its entirety.

BACKGROUND

1. Technical Field

The present disclosure relates to a system and a printing method for performing printing by combining a plurality of printing devices.

2. Related Art

JP-A-2009-178942 discloses a printing system including a plurality of printing devices, where print requests from a plurality of request sources requesting printing are assigned to any one of the plurality of printing devices based on the number of copies and the remaining amount of ink and toner.

However, in the printing system, the inventors have found that although the printing load can be dispersed, printing the same print image or the like by different printing devices may not always result in the same print result. For example, even in an ink jet printer capable of performing color printing, the range of printable colors differs depending on the type of printer, due to differences in the installed ink, the amount of ink ejected, and the like. Therefore, when printing is performed using a printing system including a plurality of printers, the print results may not be the same depending on the printer to which the printing is assigned.

SUMMARY

The present disclosure can be realized in the following aspects or application examples. A first aspect of the present disclosure is directed to a printing system including: a plurality of printing devices; a common profile section having a common profile that, in a device-independent first color system, converts image data of a color space that is representable by the first color system into image data of a color space that is commonly representable by the plurality of printing devices; a first conversion section that converts first image data representing an image to be printed into second image data by using the common profile, the image being represented by the first color system; a second conversion section that converts the second image data into third image data by using an output profile, the third image data being image data of a second color system that depends on a specific printing device designated from among the plurality of printing devices, the output profile being unique to the designated specific printing device; and a print instruction section that outputs the third image data to the designated printing device to print the third image data.

A second aspect of the present disclosure is directed to a printing method using a plurality of printing devices constituting a network. The printing method includes: preparing a common profile that, in a device-independent first color system, converts image data of a color space that is representable by the first color system into image data of a color space that is commonly representable by the plurality of printing devices; converting first image data representing an image to be printed into second image data by using the common profile, the image being represented by the first color system; converting the second image data into third image data by using an output profile, the third image data being image data of a second color system that depends on a specific printing device designated from among the plurality of printing devices, the output profile being unique to the designated specific printing device; and outputting the third image data to the designated printing device to print the third image data.

DESCRIPTION OF EXEMPLARY EMBODIMENTS

A. First Embodiment (A1) Hardware Configuration

Figure 1:
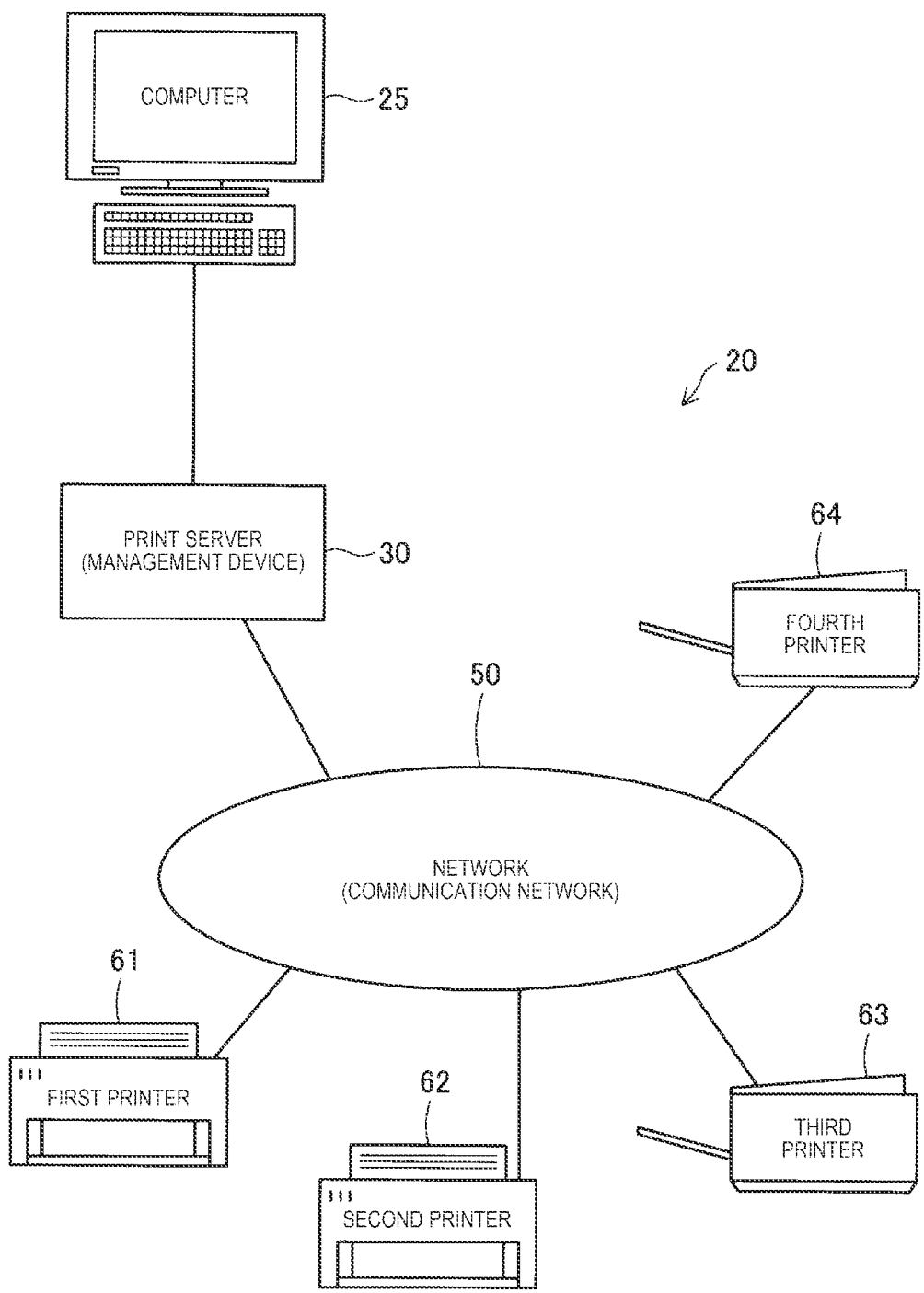
FIG. 1 is a schematic configuration diagram showing a printing system of a first embodiment.

FIG. 1 is a schematic configuration diagram of a printing system 20 of a first embodiment. The printing system 20 includes a computer 25 for generating and editing images, a print server 30 as a management device coupled to the computer 25, and first to fourth printers 61 to 64 coupled to the print server 30 through a network 50. In the printing system 20, when the computer 25 performs printing, on the computer 25, a virtual printer appears to be coupled thereto. When the computer 25 outputs image data to be printed to the virtual printer, the print server 30 spools the image data and outputs the data to any printer connected to the network 50 to print the data. In FIG. 1, although the computer 25 is described as being directly coupled to the print server 30 for the sake of understanding, the computer 25 may be also connected to the network 50 and the image data to be printed may be transmitted to the print server 30 through the network 50. Further, although the print server 30 is described as having the spool function in the present embodiment, the print server may have only the function as the management device without having the spool function.

The first printer to the fourth printer are all different printers, and their color reproduction ranges are different from one another. The color reproduction range of each printer differs depending on the number of installed ink colors, a halftoning method, and upper and lower limits of an ink ejection amount for each paper. In normal printing, that is, when outputting image data directly from the computer 25 to one printer for printing, since the image data handled on the computer 25 is represented in a device-dependent color space, such as sRGB, the image data is converted into image data of a device-independent color space, for example, L*a*b* (hereinafter sometimes simply referred to as Lab) space by using an ICC (International Color Consortium) input profile, and then, conversion is performed into image data of a color space that can be represented by the selected printer, for example, CMYK by using an output profile. The former input profile is prepared as a table for conversion from sRGB to Lab. This table is referred to as an A to B table. The latter output profile is prepared as a table for conversion from Lab to CMYK. This table is referred to as a B to A table.

In the present embodiment, as will be described later, the normal printing is possible, but normally the first to fourth printers 61 to 64 are collectively treated as a virtual printer. That is, on the computer 25, the printers 61 to 64 do not appear, and when printing is attempted, a dialog box for instructing a virtual printer to print is displayed. When a user designates a print page, the number of copies, and the like to give a print instruction, image data to be printed is spooled in the print server 30. The print server 30 recognizes a print job status of each of the printers 61 to 64, selects a printer that completes printing earliest, puts the image data converted for printing in a batch file of the selected printer, and instructs the printer to print. The printer sequentially processes the image data contained in the batch file to complete the printing. Therefore, the user who wants to print does not need to worry about which printer should be used to complete the printing quickly.

Figure 2:
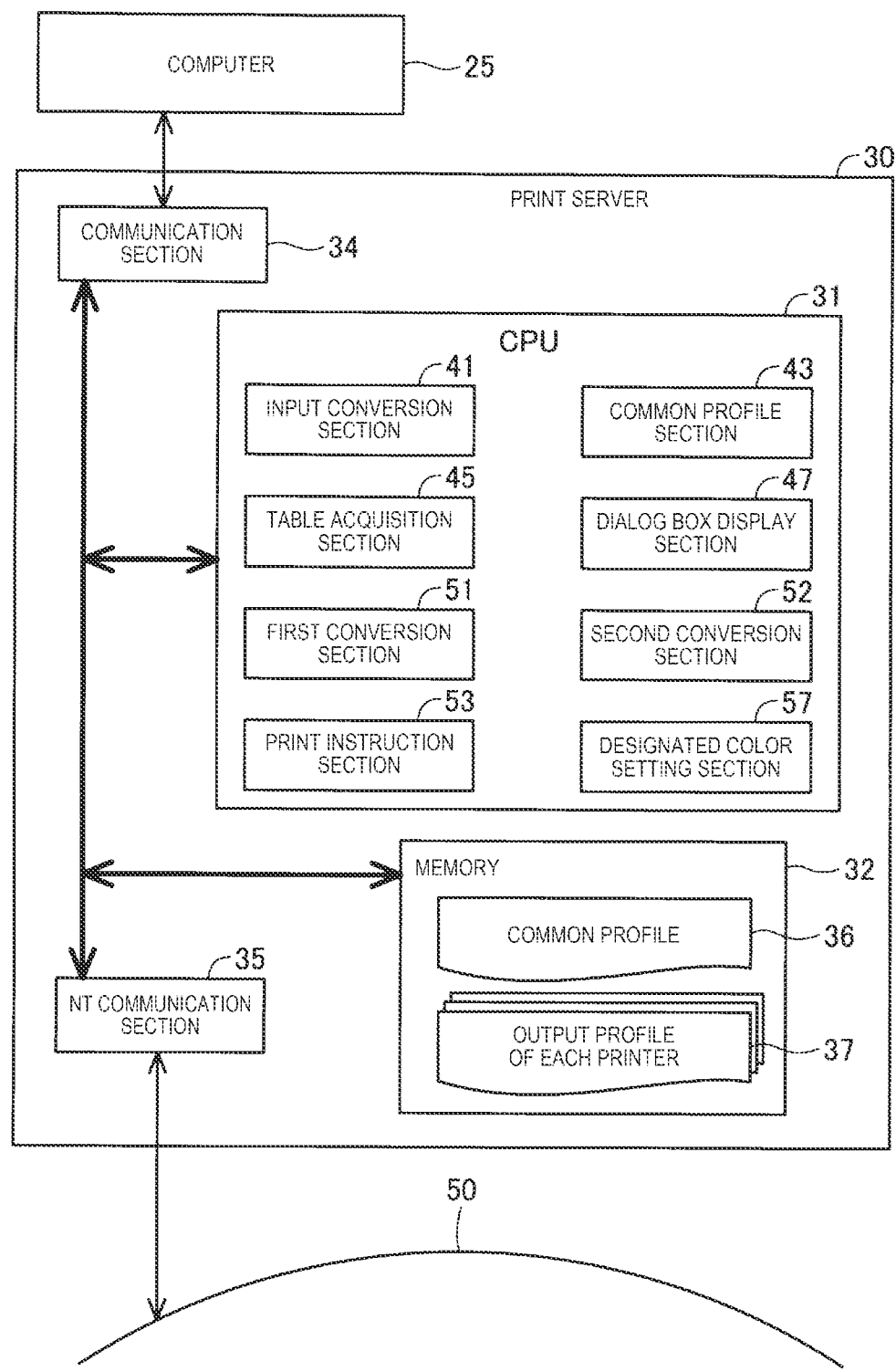
FIG. 2 is a schematic configuration diagram of a print server that is a management device.

FIG. 2 shows a schematic configuration of the print server 30 that receives a print instruction from the computer 25. As shown in the figure, the print server 30 includes a CPU 31 for executing all processes including image processing, a memory 32 for storing profiles and image data necessary for the process, a communication section 34 that exchanges data with the computer 25, and an NT communication section 35 that exchanges data with a printer for printing through the network 50. The memory 32 stores, in addition to various programs to be described later, a common profile 36 used for color conversion, an output profile 37 for each printer, which is used when individually instructing each printer to print, and the like. A method of generating these profiles and the like will be described later.

The CPU 31 implements various functions by executing the programs stored in the memory 32. These functions include an input conversion section 41, a common profile section 43, a table acquisition section 45, a dialog box display section 47, a first conversion section 51, a second conversion section 52, a print instruction section 53, a designated color setting section 57, and the like. For convenience of illustration, the designated color setting section 57 is shown in FIG. 2, but since the designated color setting section 57 is not used in the first embodiment, it may be omitted in the first embodiment. The designated color setting section 57 will be described in the second embodiment.

The operations of the above-mentioned respective sections implemented by the CPU 31 executing a predetermined program will be described. When image data input from the outside is device-dependent image data, the input conversion section 41 converts the image data into image data of a device-independent first color system. Generally, when a print instruction is received from the external computer 25 and image data for printing is received, the image data is represented by image data handled by the computer 25, for example, a color system such as sRGB. In this case, using an input profile, the image data is converted into image data of the device-independent first color system, for example, L*a*b* (hereinafter sometimes simply referred to as Lab) color system. Therefore, when the computer 25 completes this conversion and transmits the image data of the first color system, it is not necessary to perform the conversion using the input conversion section 41. The device-independent color system includes an XYZ color system and the like, in addition to the Lab.

The common profile section 43 generates the common profile 36 stored in the memory 32. The table acquisition section 45 acquires an A to B table included in the output profile of each of the first to fourth printers 61 to 64 connected to the network 50. The acquired A to B table is used to generate the common profile 36. A method of generating the common profile 36 and actual conversion using the method will be described later. The dialog box display section 47 causes the computer 25 to display a dialog box so that the computer 25 can make settings when printing. The first conversion section 51 converts image data of a color space that can be represented by the device-independent first color system such as Lab (hereinafter referred to as first image data) into image data of a color space that can be commonly represented by the plurality of printers 61 to 64 (hereinafter referred to as second image data) by using the common profile 36. In addition, the second conversion section 52 converts the second image data into image data of a second color system that depends on a specific printer designated from among the plurality of printers 61 to 64 (hereinafter referred to as third image data) by using an output profile unique to the designated specific printer. The print instruction section 53 outputs the third image data to the designated printer and gives a print instruction.

Figure 3:
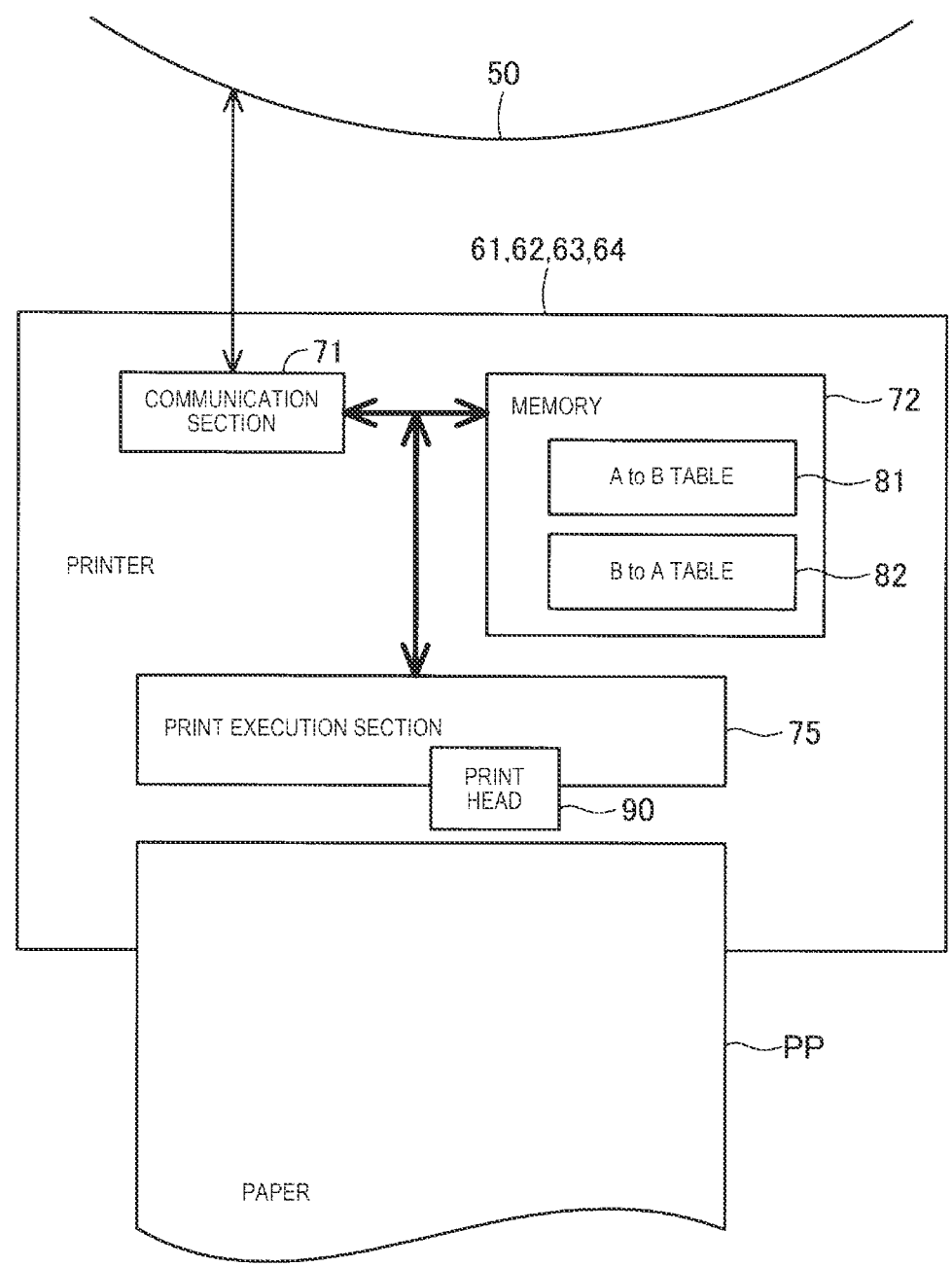
FIG. 3 is an explanatory diagram illustrating functions of a printer that is a printing device.

Next, the printers 61 to 64 will be described. Although the first to fourth printers 61 to 64 differ in the number of ink colors used for printing and the representable color range, as shown in FIG. 3, an outline of the hardware configuration is common in that they each include a communication section 71 for communicating with the print server 30 through the network 50, a memory 72 that stores image data and various tables, a print execution section 75 including a print head 90, and the like. The print execution section 75 includes a CPU (not shown), and performs color printing by using the image data received from the print server 30 through the communication section 71. At the time of printing, the print execution section 75 controls a print head drive section (not shown) to reciprocate the print head 90, eject ink, and transport printing paper PP, and the computer 25 gives a print instruction and the print server 30 prints an image corresponding to image data that has undergone spooling and color conversion of the image data, on the printing paper PP.

The memory 72 stores an A to B table 81 and a B to A table 82 that are referred to when performing color conversion in the printer. The A to B table 81 is a table showing a reproducible color gamut of each printer, and the B to A table 82 is a table for converting image data of the Lab color system into device colors of each printer. Each printer has the B to A table 82 corresponding to the number of ink colors of its own. The B to A table is prepared for each number of ink colors and each type of media to be printed. Each of the printers 61 to 64 may transmit the A to B table 81 to the print server 30 through the network 50 in response to a request from the print server 30.

(A2) Common Profile Generation Process

Figure 4:
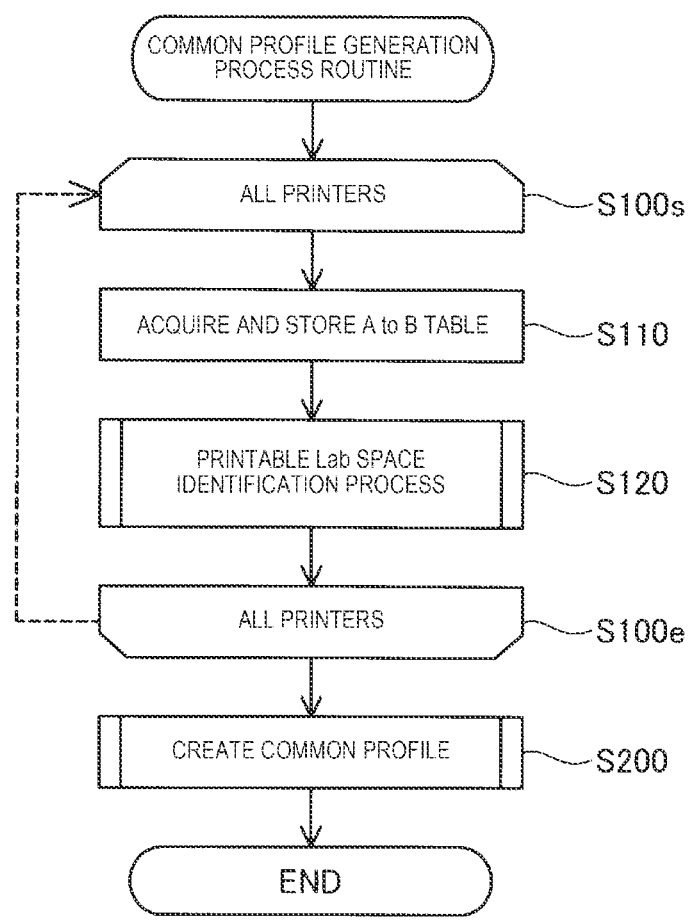
FIG. 4 is a flowchart showing a common profile generation process executed by the print server.

The printing system 20 generates the common profile 36 prior to printing. The common profile 36 is created by a process executed by the print server 30 connected to the network 50 when image data printing is instructed from the computer 25. This process will be described. FIG. 4 is a flowchart showing a common profile generation process routine executed by the print server 30 prior to printing. The CPU 31 of the print server 30 executes a process shown in FIG. 4 as the process of the common profile section 43.

When this process is started, the print server 30 repeats the processes from steps S100s to S100e for all printers connected to the network 50. Here, all printers are printers which are connected to the network 50 and powered on. Therefore, the number of printers to be processed differs depending on the situation at that time. When the process shown in FIG. 4 is started, the print server 30 broadcasts to the network 50, acquires a correspondence from each printer, knows the printer connected to the network 50, and repeats the processes of steps S100s to S100e. In the present embodiment, the first to third printers 61 to 63 are powered on, and these printers are treated as all printers capable of printing from the print server 30.

The print server 30 executes the function as the table acquisition section 45, acquires the A to B table 81 from the first printer 61 connected to the network 50, and stores the A to B table in the memory 32 as the output profile 37 of each printer (step S110). Next, a process of identifying a printable Lab space from the received A to B table 81 is performed (step S120). This process is a process of identifying the range of colors that can be reproduced by the printer to be processed in the Lab space.

Figure 5A:
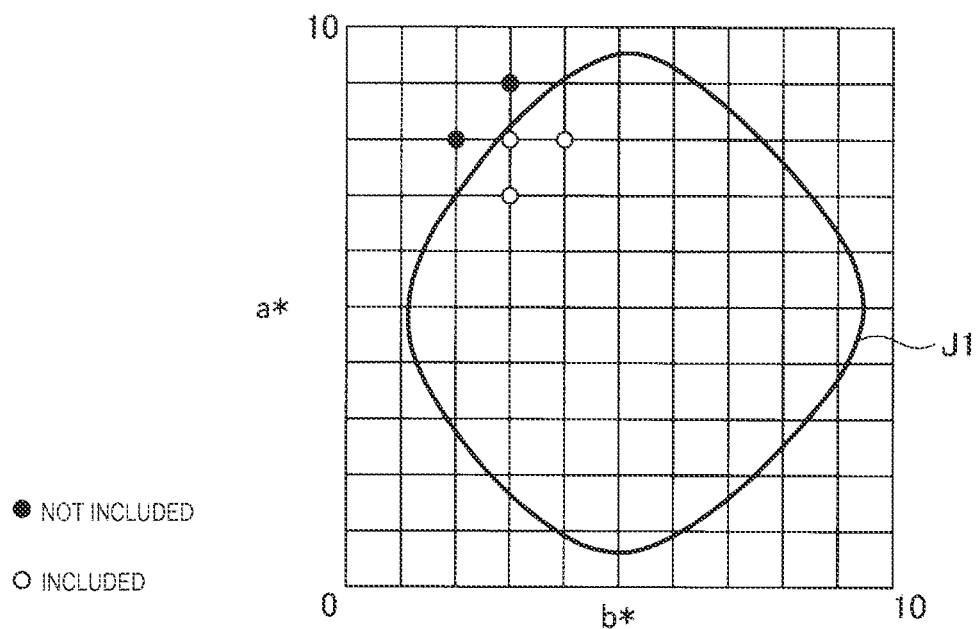
FIG. 5A is an explanatory diagram showing an example of a color range that can be represented by a first printer.
Figure 5B:
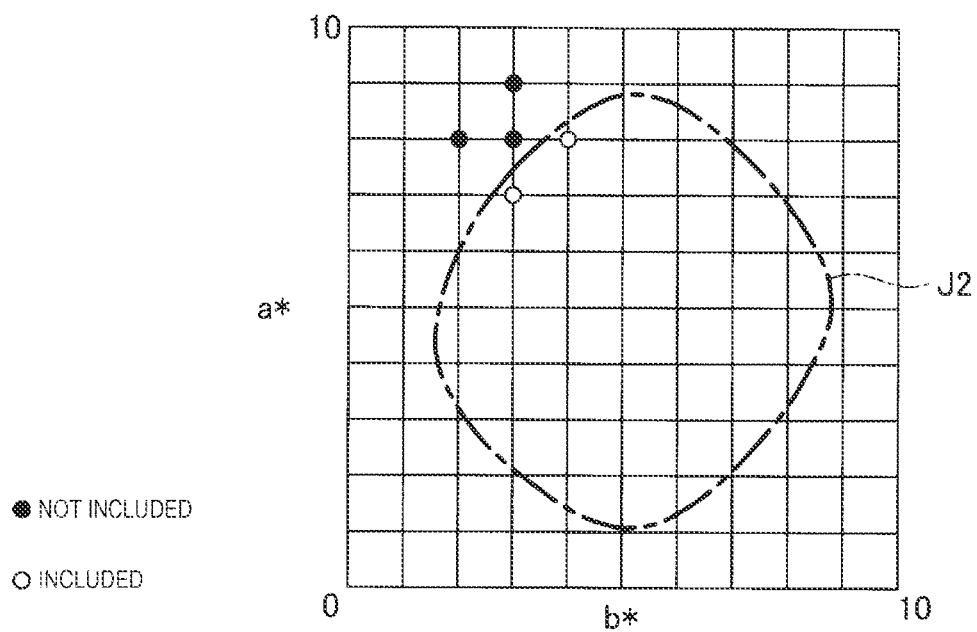
FIG. 5B is an explanatory diagram showing an example of a color range that can be represented by a second printer.
Figure 5C:
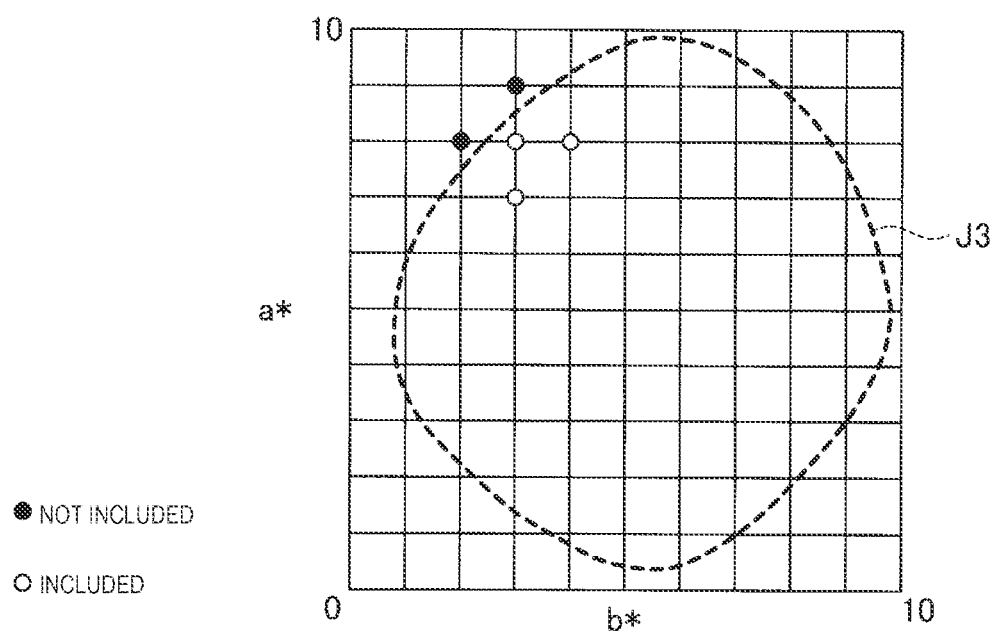
FIG. 5C is an explanatory diagram showing an example of a color range that can be represented by a third printer.

The process of identifying a printable Lab space in step S120 will be described with reference to FIGS. 5A to 5C. FIG. 5A is an explanatory diagram showing an a*-b* plane at a certain lightness L*. In the figure, a solid line J1 indicates the extension of the range that can be represented by the first printer 61 in the Lab space. For all grid points in the a*-b* plane, determination is made as to whether or not the grid points are included in the range indicated by the solid line J1. In the figure, circles filled with black indicate that they are not included in the color range that can be represented by the first printer 61, and circles filled with white indicate that they are included in the representable color range. The print server 30 sequentially identifies a printable Lab space by using the acquired A to B table of the first printer 61. FIG. 5A shows the a*-b* plane at one lightness L*, and the print server 30 makes the same determination for all lightness ranges.

Since grid points having one lightness L* shown in FIG. 5A are adjacent to grid points having a higher lightness or a lower lightness than the lightness L*, whether or not the grid points are included in the printable lab space needs to be determined stereoscopically in practice. The determination can be made by dividing an hexahedron in which grid points are placed at each vertex of a cube into tetrahedra each having one vertex and three vertices adjacent to the vertex. By using the fact that, when a point to be determined is included in a tetrahedron, the sum of the volume of the tetrahedron connecting this point and three vertices among vertices of the tetrahedron equals the volume of the original tetrahedron, and when the point to be determined is not included in the tetrahedron, both volumes are not equal, the determination can be easily made. Of course, the determination is made only in the vicinity of the extension of the range that can be represented by the printer and when the grid points are clearly included in the representable range, or in contrast, when the grid points are not clearly included, the processing time may be shortened by not making the determination using a tetrahedron or the like.

After performing the above-described process of step S120, it is determined whether the processes for all printers have been completed, and when the processes for all printers have not been completed, the processes of steps S110 and S120 are repeated for sequentially different printers. FIG. 5B is an explanatory diagram showing an a*-b* plane at a certain lightness L* in the A to B table of the second printer 62. In the figure, an alternate long and short dash line J2 indicates the extension of the range that can be represented by the second printer 62 in the Lab space. The print server 30 sequentially identifies a printable Lab space similarly to the acquired A to B table of the first printer 61.

The print server 30 further acquires the A to B table from the third printer 63 and repeats the same process. FIG. 5C shows an a*-b* plane at a certain lightness L* of the third printer 63. In the figure, a broken line J3 indicates the extension of the range that can be represented by the third printer 63 at the certain lightness L*. The print server 30 sequentially identifies a printable Lab space similarly to the acquired A to B tables of the first and second printers 61 and 62.

Figure 6A:
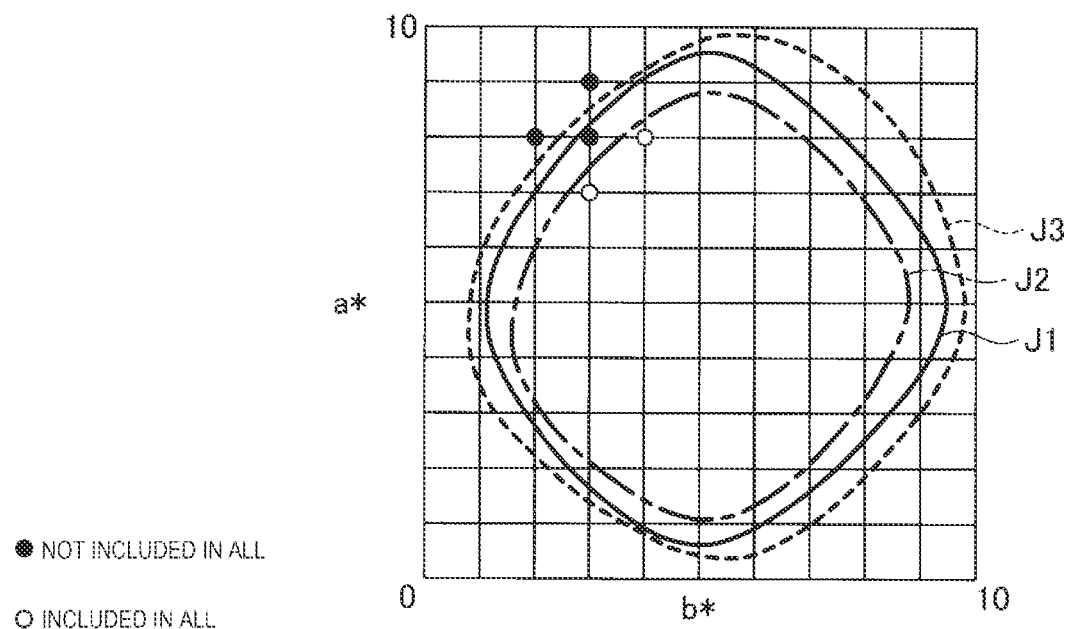
FIG. 6A is an explanatory diagram showing color ranges that can be reproduced by the first to third printers in an overlapping manner.
Figure 6B:
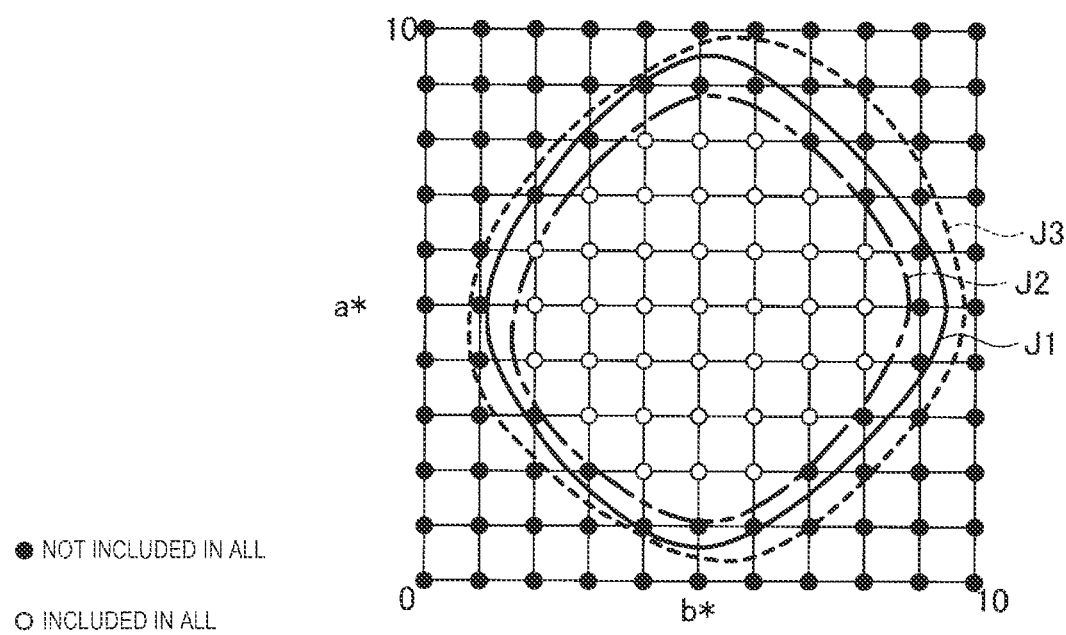
FIG. 6B is an explanatory diagram illustrating a color range that can be commonly represented by the first to third printers.

After performing these processes for all the printers 61 to 63 connected to the network 50, the print server 30 next performs a process of creating the common profile 36 (step S200). The common profile 36 is created by overlapping the Lab color spaces that can be represented by the printers 61 to 63, which are identified and stored in step S120, and determining whether each grid point in the a*-b* plane is included in the range that can be represented by all printers or not included in the range that can be represented by all the printers. FIG. 6A shows an example of this. In the figure, circles filled with black indicate that they are not included in the color range that can be represented by all printers, and circles filled with white indicate that they are included in the color range that can be represented by all printers. FIG. 6B shows an example of the result of determination for all grid points at a certain lightness L*. This process is equivalent to finding the intersection of the A to B tables for all available printers. In this example, the range that can be represented by the second printer 62 is the narrowest, and consequently, the range that can be represented by the second printer 62 and the range that can be represented by all printers are the same. However, in some cases, depending on the printer, the representable range may have a narrow area in the a*-b* plane, and the color range that can be represented by all printers is usually different depending on the combination of printers. The common profile 36 is a profile that converts the color range to be printed into a color range that can be printed by all coupled printers in the Lab space. Therefore, in the profile of this example, Lab→Lab conversion is performed.

In the above description, the image to be printed is sRGB, but the device-dependent device colors are present in addition to sRGB. When the color system of the print image is different, an input profile is prepared for each device color in order to convert the color system into image data of a device-independent color system, for example, the Lab color system. The input profile is a table for converting device colors into image data of a device-independent color system. Each printer has a number of input profiles according to the type of print image. When the input profile is different, the common profile 36 is also strictly different. Therefore, the common profile 36 may be created for each input profile in case of different print image formats.

Figure 7:
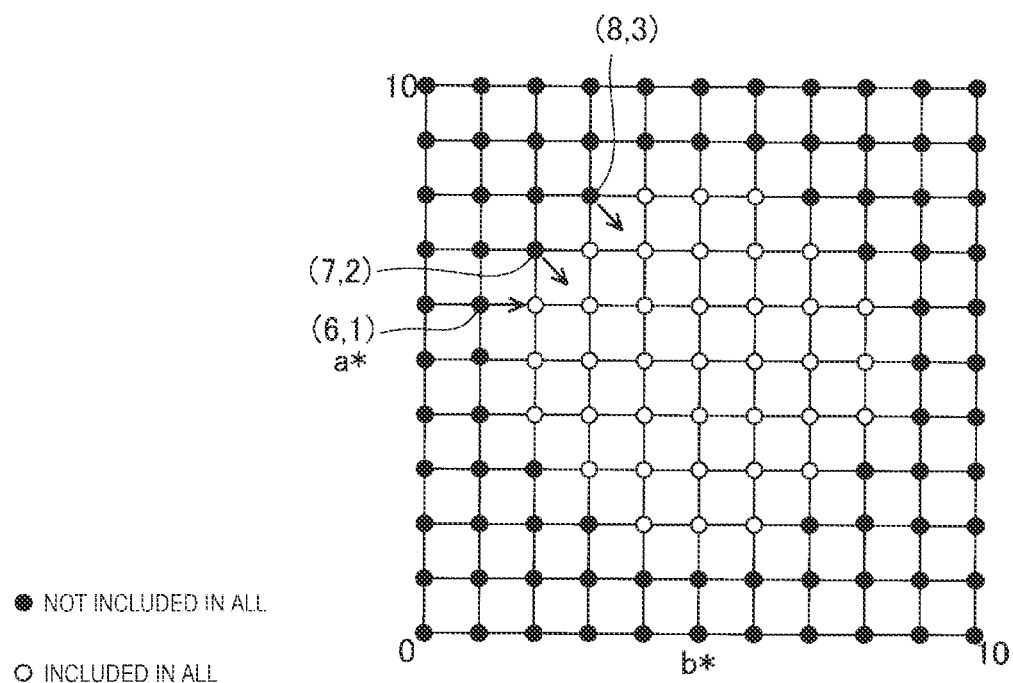
FIG. 7 is an explanatory diagram showing a state in which grid points outside a range that can be commonly represented are mapped within the range.

In this way, for the entire Lab color space, the range that can be represented by the first to third printers 61 to 63 is obtained and stored in the memory 32 as the common profile 36, the process goes to "END", and the process of FIG. 4 is ended. In the above description, the common profile 36 indicates the minimum range that can be represented by printing in all printers connected to the network 50 and capable of printing. However, for example, with the third printer 63, as shown in FIG. 6B, colors within the originally representable range are not represented. Therefore, as shown in FIG. 7, the grid points (6,1), (7,2), and (8,3) that have been originally represented are subjected to a mapping process such that they are remapped to grid points included in the representable range or the vicinity thereof, and then are subjected to a process of apparently expanding the representable color range, which may result in obtaining the common profile 36. Such a mapping process is described in, for example, JP-A-2001-144985, and is well known.

After executing the process of generating the common profile 36 described above, the print server 30 starts a printing process. In the present embodiment, the print server 30 generates the common profile 36 when receiving the print instruction. However, at the time when the print server 30 is powered on and connected to the network 50, the print server 30 may perform the process of creating the common profile 36 regardless of the presence or absence of a print request, and thereafter, the common profile 36 may be updated every time the configuration of the printer connected to the network 50 changes. At the time of updating, the A to B table may be acquired again from each printer, and since the table acquired once is stored in the memory 32 as the output profile 37 of each printer, the table may be acquired only from a printer newly connected to the network 50, and the output profile 37 stored in the memory 32 may be used for the existing printer.

Figure 8:
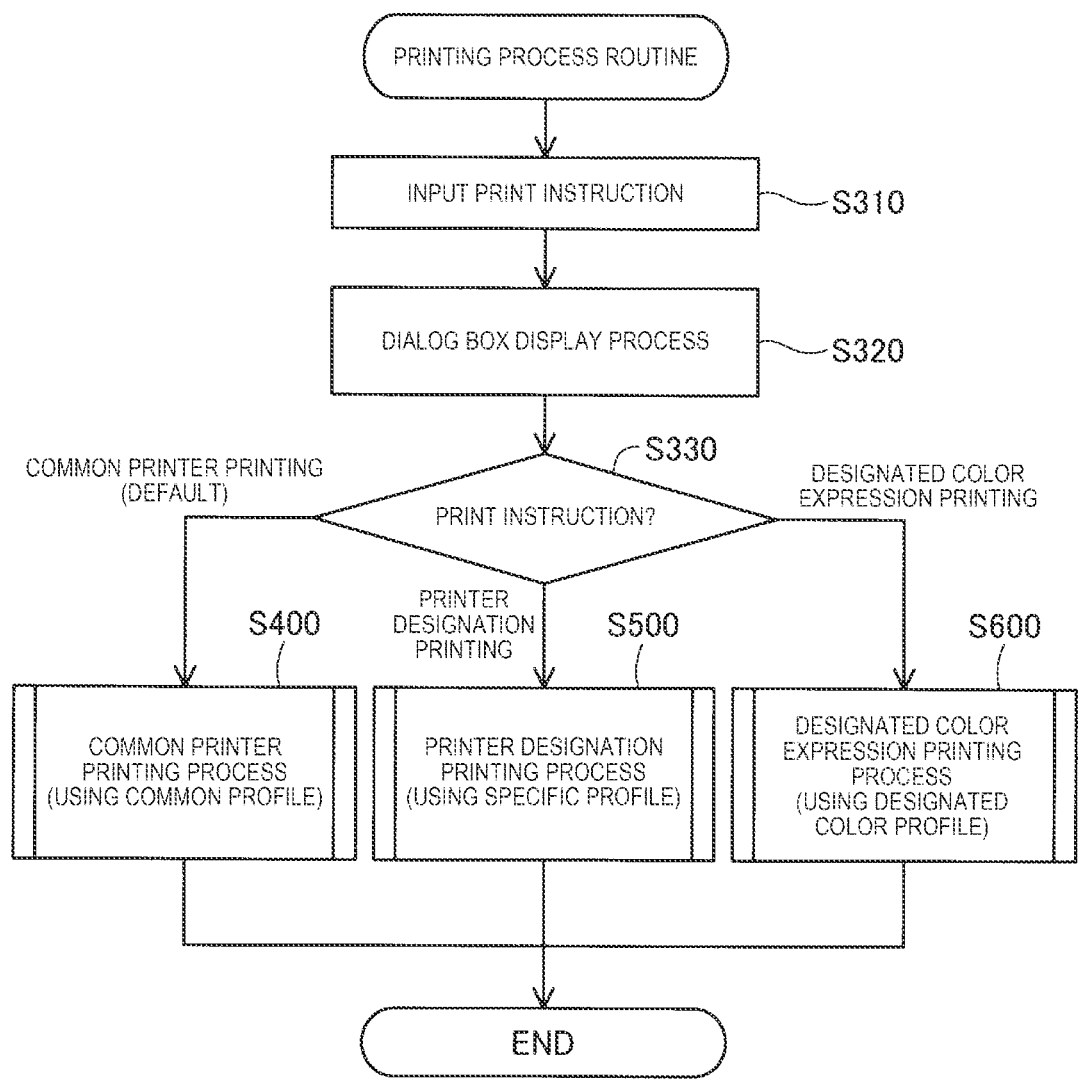
FIG. 8 is a flowchart showing the content of a printing process executed by the print server.
Figure 9:
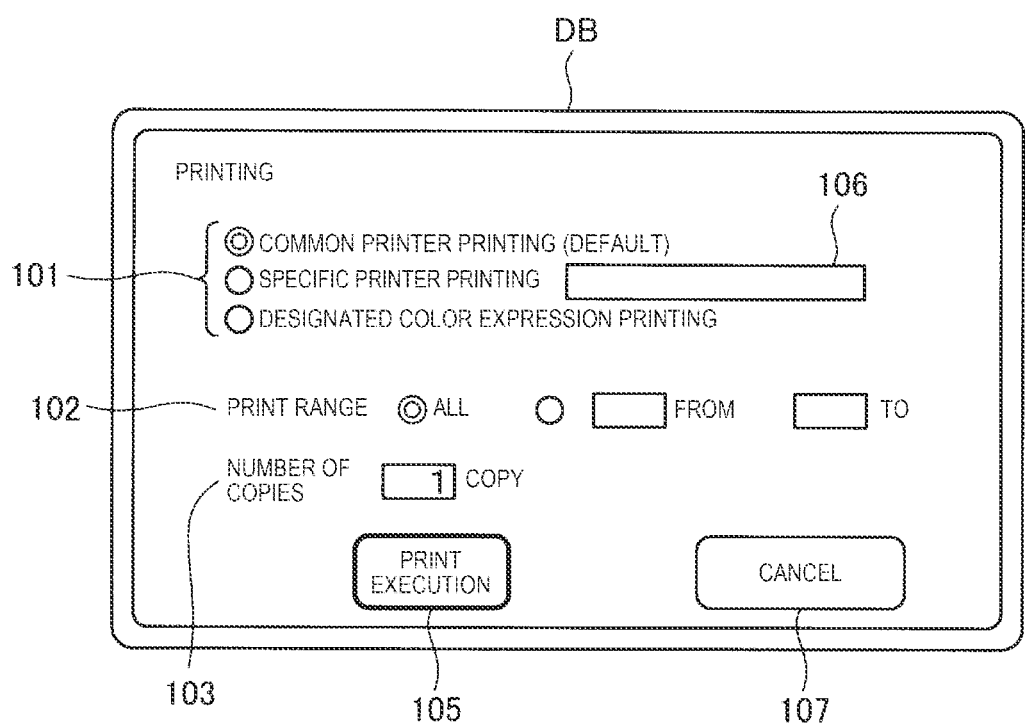
FIG. 9 is an explanatory diagram showing an example of a dialog box for printing.

The print server 30 executes a printing process routine shown in FIG. 8. When this process is started, first, a print instruction is input from the computer 25 (step S310), and in response to the instruction, the function of the dialog box display section 47 is executed, and a dialog box for printing is displayed on the computer 25 that has given the print instruction (step S320). FIG. 9 shows an example of a dialog box DB for printing displayed on the computer 25. Information necessary for displaying the dialog box DB is transmitted from the print server 30 to the computer 25.

In the example shown in FIG. 9, in the dialog box DB, in addition to a print mode designation section 101 that designates a print mode, a print range designation section 102 that designates a print range, and a print copy number designation section 103 that designates the number of copies, a "print execution" button 105 for instructing print execution, a "cancel" button 107 for instructing to cancel printing, and the like are also displayed.

Here, three options are displayed on the print mode designation section 101 together with a radio button indicating a selected state. The first option is "common printer printing", which is the default setting. "Common printer printing" is a mode in which printing is performed by any of the printable printers that are coupled through the network 50, and a print mode in which the same print result is obtained regardless of which printer is used for printing. The second option is "specific printer printing". In this mode, a printer that the user wants to perform printing can be specified from among a plurality of printers connected to the network 50, and printing can be performed. When the radio button of "specific printer printing" is selected, a pull-down menu 106 on the right becomes active, and from the pull-down menu 106, the user can select the printer to perform printing. The third option is "designated color expression printing". In the first embodiment, "designated color expression printing" is shown as not being selectable. The "designated color expression printing" will be described in the second embodiment.

In addition, the print range designation section 102, the print copy number designation section 103, and the like displayed in the dialog box DB are well known, and therefore detailed description thereof will be omitted. When the "print execution" button 105 is pressed after the necessary settings have been made for the displayed dialog box DB, the print server 30 reads various settings made by the dialog box DB and first determines the designation of the print mode (FIG. 8, step S330). This determination can be easily made from designation by the radio button in the print mode designation section 101 of the dialog box DB.

When the default "common printer printing" is designated by the print mode designation section 101 of the dialog box DB, a common printer printing process using the common profile 36 (step S400) is performed. When printer designation printing is designated, a printer designation printing process using the specific profile (step S500) is executed. Although a case in which designated color expression printing that cannot be designated in the present embodiment is designated will be described in the second embodiment, a designated color expression printing process using a designated color profile (step S600) is executed. After these processes are ended, the process goes to "END" and the printing process routine is ended.

Figure 10:
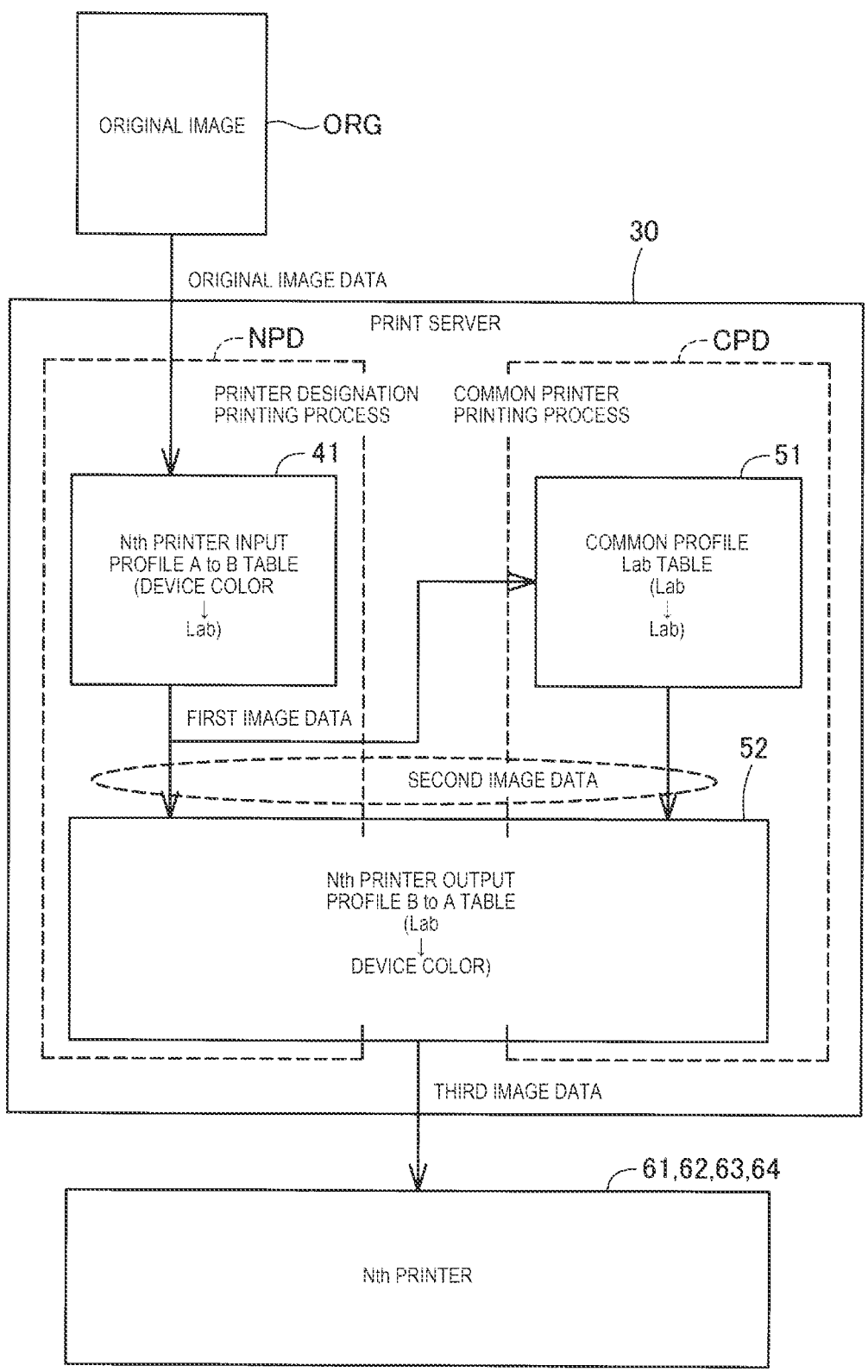
FIG. 10 is an explanatory diagram showing a flow of image data and a state of color conversion in the print server.

An outline of the common printer printing process (step S400) and the printer designation printing process will be described with reference to FIG. 10. FIG. 10 is an explanatory diagram showing a process flow until original image data of an original image ORG to be printed by the computer 25 is printed by any printer. The original image data is device-dependent image data and is transferred from the computer 25 to the print server 30. When the print mode designation section 101 designates common printer printing, the print server 30 determines the printer to print the received original image data, and then transfers the original image data to a printer designation printing processing section NPD. The printer used in the common printer printing is not designated by the user, but is determined by the print server 30 based on the printing capability, the current print queue length, and the like.

In the first embodiment, the first to third printers 61 to 63 are capable of performing printing, but the printer to print the original image data is determined from among the aforementioned printers. Hereinafter, this printer is referred to as an Nth printer (N is any one of 1, 2, and 3). The print server 30 reads, from the Nth printer, the A to B table which is the input profile, and uses the table to convert the device color into the image data of the Lab color system. The conversion is performed by the input conversion section 41, and the converted image data is the first image data.

For common printer printing, the print server 30 transfers the first image data to a common printer printing section CPD. The first conversion section 51 included in the common printer printing section CPD uses the common profile 36 to convert the first image data into the second image data. This conversion is a conversion in a Lab→Lab color system, which is device-independent. As shown using FIG. 6B, the conversion is performed by converting the first image data converted into the image data of the Lab color system, which is the image data to be printed, into the second image data that is the image data of the representing range common to the printable printers. Then, the second image data thus converted is converted into the third image data that is a printer-dependent device color by the second conversion section 52, by using the B to A table 82 included in the output profile 37 for the Nth printer selected as a printing process destination. The third image data is data corresponding to the number of ink colors and the print medium of the printer that actually prints. This data is output to the Nth printer and printing is executed.

The above process is the same for any printer of a print destination if the printer can perform printing through the network 50. First, conversion is performed into the first image data that is the image data of the Lab color system, that is, the device-independent color system, by using the input profile of the selected printer, and then, the converted first image data is converted into the second image data in the same Lab color system by using the common profile 36 generated in advance. By this process, the range of colors to be represented becomes the same regardless of which printer is designated. Therefore, the range of colors to be represented does not differ due to the difference in the printer to perform printing. Since the third image data, which is the image data that is actually output to the printer, is converted by using the output profile of the printer to perform printing, the third image data matches the number of ink colors of the printer and the characteristics of the print medium used.

On the other hand, when the printer designation printing is designated by the dialog box DB, the first image data converted into the Lab color system data by the process of the input conversion section 41 is directly used as the second image data, conversion is performed using the output profile 37 of the selected printer by the function of the second conversion section 52, and then conversion into the third image data is performed. In this case, since the function of the first conversion section 51, that is, the process of converting the range of colors to be used into the intersection of color ranges that can be represented by a plurality of printers that can be used in the same Lab space is not performed, printing is performed by using the entire color range that can be represented by the selected printer. Therefore, the representable color range differs depending on the selected printer. That is, the color of the printed image or the like may be different depending on the selected printer. Therefore, when a printer with a wide range of color representation is designated, a wide range of colors can be reproduced.

In the printing system 20 of the first embodiment described above, there is an advantage in that even when any printer coupled to the print server 30 through the network 50 is selected as the print destination, the color of the printed image does not change. Therefore, the user does not need to consider or designate which image is output to which of the plurality of printers. Therefore, it is possible to shorten the time for printing.

As shown in FIG. 10, in the present embodiment, the second conversion section 52 using the same output profile is configured to be shared when printing is performed in the same color range regardless of the printer by using the common profile 36 and when printing is performed in the representable color range by a specific printer, but the common printer printing section CPD and the printer designation printing processing section NPD may be configured to be completely separated. That is, two second conversion sections 52 may be provided, the common printer printing section CPD may be provided with the input conversion section 41, the first conversion section 51, and the second conversion section 52, and the printer designation printing processing section NPD may be provided with the input conversion section 41 and the second conversion section 52. The latter is the same as the printing configuration in the related art.

Further, in the present embodiment, the original image data output from the computer 25 is represented by the device-dependent color system and is converted into the first image data which is the image data of the device-independent color system by using the input conversion section 41, but when the computer 25 outputs the image data represented by the device-independent color system, for example, the Lab color system or the XYZ color system as the original image data, conversion by the input conversion section 41 in FIG. 10 may be omitted.

B. Second Embodiment

Figure 11:
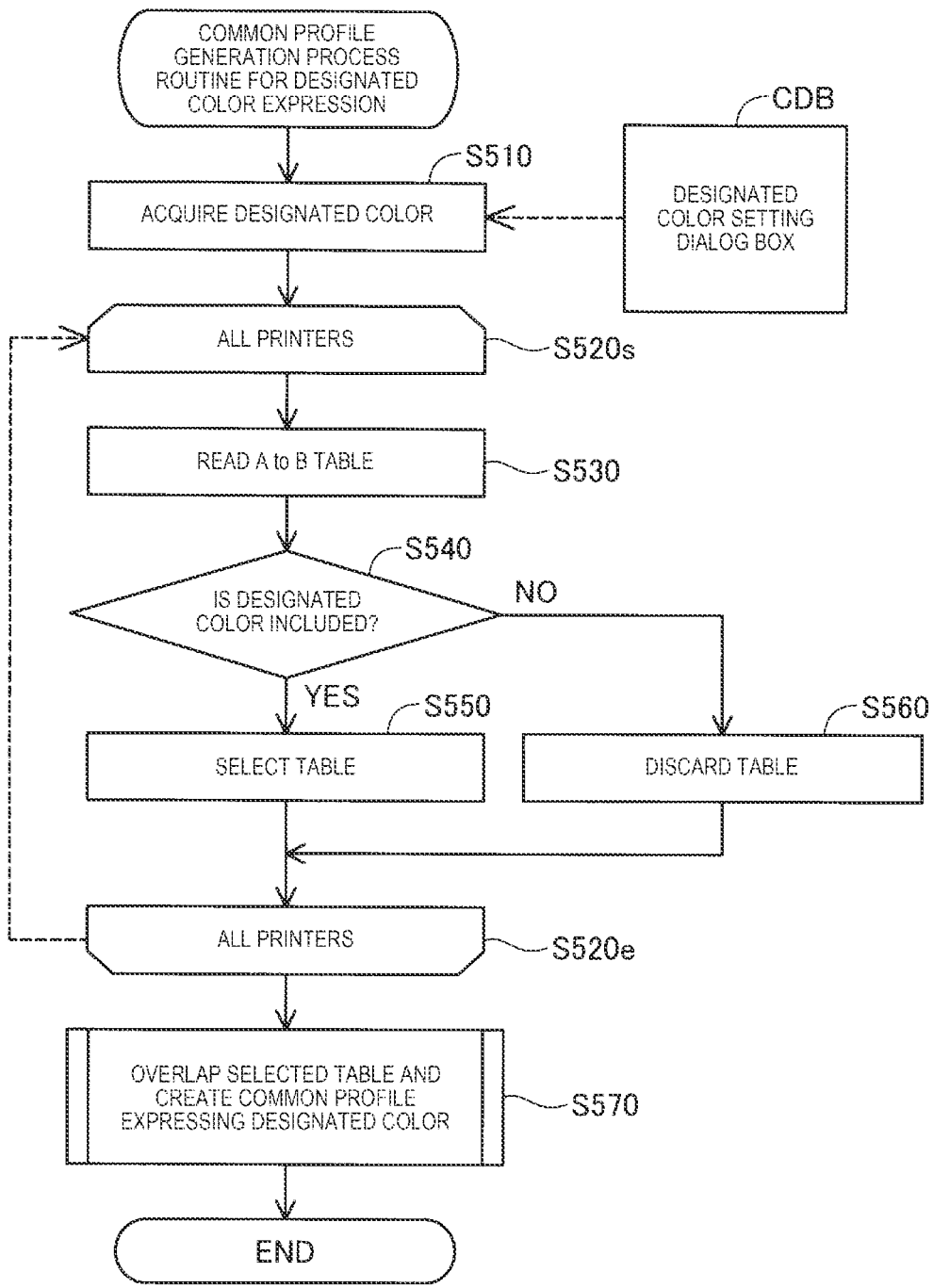
FIG. 11 is a flowchart showing a common profile generation process for designated color expression, which is executed by a print server in a printing system of a second embodiment.

Next, the printing system 20 of the second embodiment will be described. The printing system of the second embodiment has the same hardware configuration as that of the first embodiment, and differs in the process of creating the common profile 36 prior to printing. FIG. 11 shows a generation process of the common profile in the second embodiment. This is a process corresponding to the process of FIG. 4 of the first embodiment, but unlike the first embodiment, the process is performed at the timing when the "designated color expression printing" is designated in the dialog box DB illustrated in FIG. 9.

Figure 12:
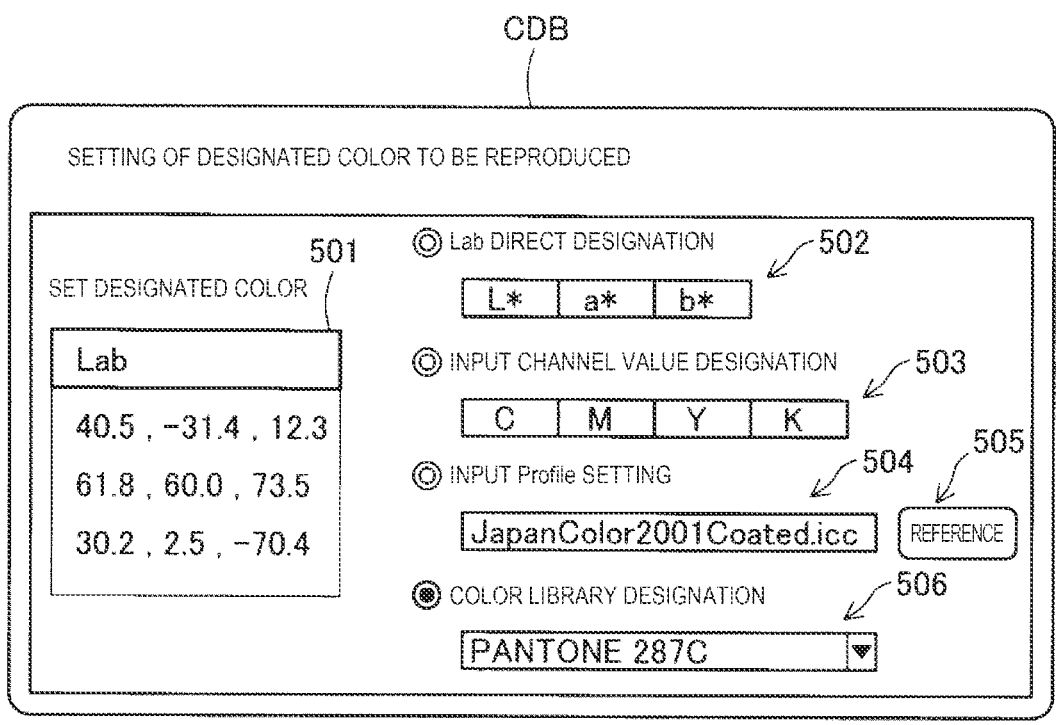
FIG. 12 is a flowchart showing an example of a dialog box for setting a designated color to be reproduced.

When this process is started, the print server 30 first performs a process of acquiring a designated color from a designated color setting dialog box CDB (step S510). When the "designated color expression printing" is designated in the dialog box DB illustrated in FIG. 9, the designated color setting dialog box CDB illustrated in FIG. 12 is displayed on the screen of the computer 25, and a designated color to be reproduced is set through the designated color setting dialog box CDB.

In the designated color setting dialog box CDB, a display box 501 showing the set designated color in the Lab color system and four options for setting the designated color are displayed with radio buttons. The first option is "Lab direct designation", and when the user who instructs the computer 25 to print clicks the radio button of this option, the numerical value of L*a*b* can be directly input to a Lab input field 502. The second option is "input channel value designation", and when the user clicks the radio button of this option, the numerical values of CMYK can be directly input to a channel value input field 503.

The third option is "input profile setting", and when the user clicks the radio button or a reference button 505 of this option, one of the stored input profiles can be selected. The file name of the selected input profile is displayed in a file name field 504. By selecting the input profile, the color range included in the input profile is treated as the designated color to be reproduced. The last option is "color library designation", and when the radio button of this option is clicked, the color library can be selected from a pull-down menu 506. In the present embodiment, the designated color can be set in various methods described above, but one or more designated color settings may be prepared. Alternatively, a plurality of predetermined designated colors may be displayed and just selected.

When the designated color set by the designated color setting dialog box CDB is acquired (step S510), the print server 30 repeats the processes from steps S520s to S520e for all printers connected to the network 50. Here, all printers are printers which are connected to the network 50 and powered on. Therefore, the number of printers to be processed differs depending on the situation at that time. The print server 30 broadcasts to the network 50, acquires a correspondence from each printer, knows the printer connected to the network 50, and repeats the processes of steps S520s to S520e. In the present embodiment, the first to fourth printers 61 to 64 are powered on, and these printers are treated as printers capable of printing from the print server 30.

Figure 13:
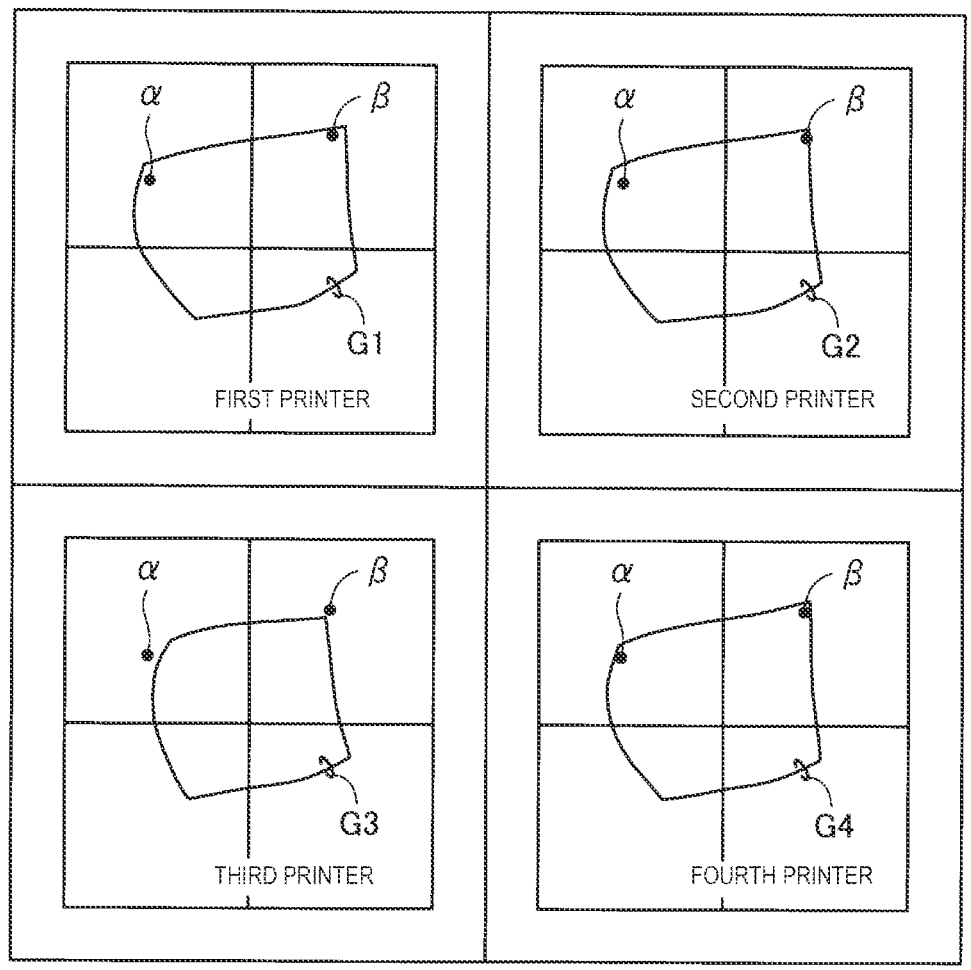
FIG. 13 is an explanatory diagram showing whether or not a designated color is within a reproducible color range in each printer.

The print server 30 performs the function as the table acquisition section 45, and acquires the A to B table 81 which is the output profile from the first printer 61 connected to the network 50 (step S530). Next, determination is made as to whether or not the received A to B table 81 includes the designated color (step S540). FIG. 13 illustrates a relationship between the range of the A to B table of each printer and the designated color. In the figure, G1 to G4 indicate the extension of the representable color range of the first to fourth printers 61 to 64. Further, points α and β indicate two designated colors designated by the designated color setting dialog box CDB. When both the points α and β indicating the designated color (hereinafter, simply designated colors α and β) are included in the color range, the determination in step S540 is "YES" and the table of the printer is selected (step S550). On the other hand, when the designated colors α and β are not included in the color range G3 like the third printer 63, the determination in step S540 is "NO", and the table of the printer is not selected (step S560).

Figure 14:
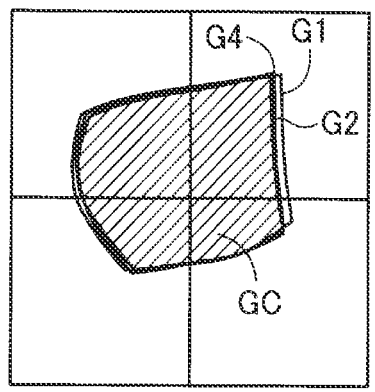
FIG. 14 is an explanatory diagram showing a color range in which a common profile for designated color reproduction is reproduced.

When the above processes are completed for all printable printers, then all the selected A to B tables are overlapped to create a common profile capable of expressing the designated colors α and β (step S570). In this example, as illustrated in FIG. 14, the common profile is constructed by overlapping the color ranges G1, G2, and G4 of the A to B tables of the three selected printers, and obtaining a range GC that is the intersection of them. The actual overlapping method is the same as in the first embodiment (see FIGS. 6A, 6B, and 7). The printing method is also the same as that of the first embodiment, except that the common profile 36 used is the common profile that expresses the designated color created by the above method.

In the printing system 20 of the second embodiment described above, in addition to achieving the same effect as that of the first embodiment, when a specific color (designated color) is desired to be represented, the common profile 36 including the designated color can be created by designating "designated color expression printing", and a printed matter representing the designated color can be obtained by using the created common profile 36.

C. Third Embodiment

The printing system 20 of a third embodiment performs the same process as that of the first and second embodiments, but in addition to that, the common profile update process (FIG. 15) is performed. As described above, the common profile is for performing printing in the color range that can be represented by any printable printer, and thus, when the printable printer changes, the common profile also differs. Therefore, in the first and second embodiments, the common profile is generated when the print instruction is received. However, when the printing system 20 is activated, the process illustrated in FIG. 4 may be executed to generate the common profile once and thereafter, the common profile may be updated every time the configuration of the printer is changed.

Figure 15:
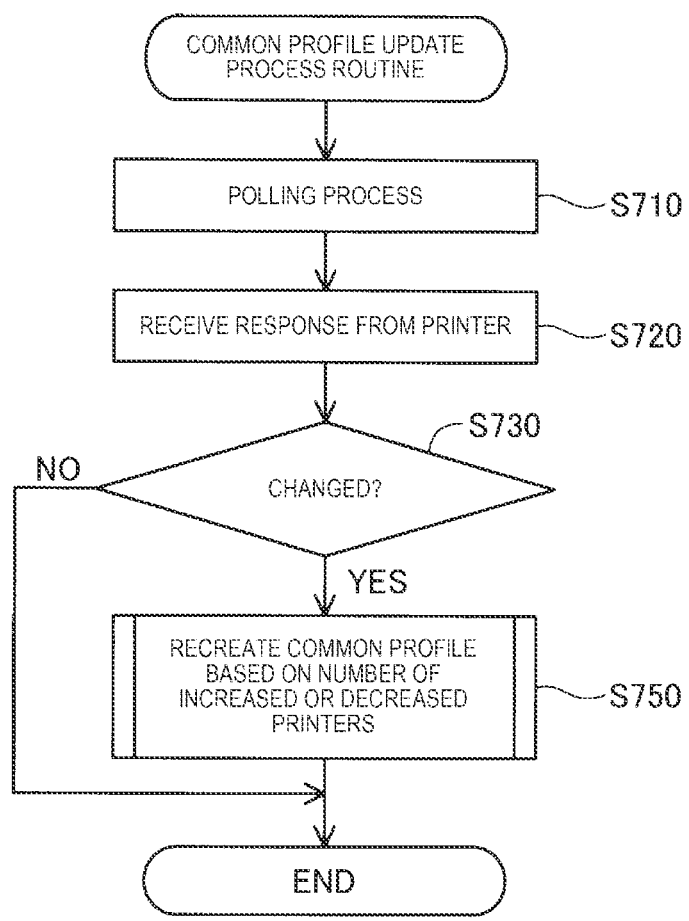
FIG. 15 is a flowchart showing an outline of a common profile update process.

FIG. 15 shows an example of the update process. The update process routine is started in the print server 30 at a predetermined interval, for example, every few seconds or every few minutes. When this process routine is started, the print server 30 first performs a polling process for the printers connected to the network 50 (step S710). Since the print server 30 has a list of all printers connected to the network 50, the print server 30 polls the printers in order and receives the responses from the printers (step S720). The printers that are currently connected to the network 50 can be known from the responses to the polling performed on all the printers.

Therefore, determination is made as to whether or not the configuration of the printer connected to the network 50 has changed (step S730), and when there is no change, nothing is done, the process goes to "END", and this process routine is once ended. On the other hand, when it is determined that the configuration of the printer connected to the network 50 has changed (step S730: "YES"), a process of recreating the common profile is performed based on the number of the increased or decreased printers (step S750). The method of recreating the common profile is the same as in the first embodiment (see FIGS. 6A, 6B, and 7).

According to the printing system 20 of the third embodiment described above, since the same printing as in the first and second embodiments can be performed and the common profile 36 is constantly updated, when there is a print instruction from the computer 25, the common profile 36 does not have to be generated at that time. Therefore, the time taken from the print instruction to the actual printing can be shortened.

D. Fourth Embodiment

Figure 16:
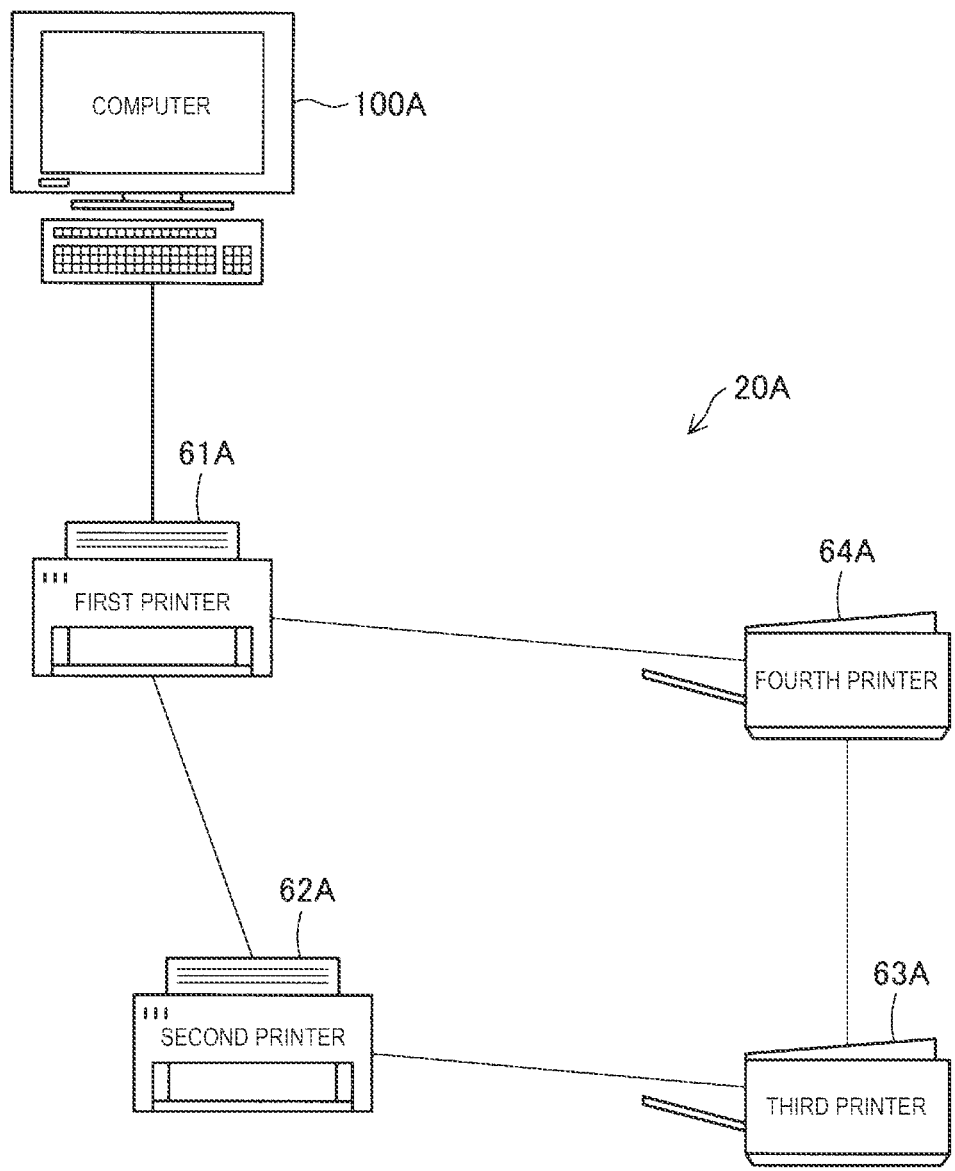
FIG. 16 is a schematic configuration diagram showing a printing system of a third embodiment.

FIG. 16 shows a printing system 20A of a fourth embodiment. The printing system 20A of the fourth embodiment uses a so-called closed network (hereinafter referred to as a closed network), as shown. In the system, a computer 100A for giving a print instruction is directly coupled to a first printer 61A. This coupling is a so-called peer-to-peer (hereinafter abbreviated as P2P) connection, and other devices cannot participate in the coupling between the two. Furthermore, the first printer 61A and a second printer 62A, the second printer 62A and a third printer 63A, the third printer 63A and a fourth printer 64A, and the fourth printer 64 and the first printer 61A are also coupled by P2P. Therefore, the computer 100A cannot directly communicate with the second printer 62A from the fourth printer 64A.

In the printing system 20A according to the fourth embodiment, each printer can output a request from another coupled printer to still another coupled printer in response to the request, or can output necessary information such as the output profile (the A to B table or the B to A table), in response to the request from the printer. Therefore, when the computer 100A tries to print, first, the first printer 61A is instructed to collect the output profiles from the printers 62A, 63A, 64A including the first printer 61A, and from all the collected output profiles, the common profile is generated (see FIG. 4). Then, the computer 100A sets a specific printer to perform printing, and then performs color conversion using the common profile to output the converted image data to the specific printer. In this case, when the specific printer is other than the first printer 61A, the image data is transmitted to the specific printer by repeating P2P communication through the other coupled printers. The common profile may be generated by the first printer 61A, rather than by the computer 100A. Since even when any printer performs printing, the image data for printing passes through the first printer 61A, it is desirable that the first printer 61A implements the function as the first conversion section 51 using the common profile from the viewpoint of the communication path. Of course, the generation of the common profile and the conversion by the first conversion section 51 may be performed by another printer.

Even for the closed network that has been described above, printing can be performed in the same color range by using any printer, as in the printing systems according to the first to third embodiments. In addition, printing performed using a specific printer in the color range that can be represented by the printer (specific printer printing), or printing performed by any of a plurality of printers that can represent the designated color (designated color expression printing) can be achieved as in the first and second embodiments. Even with the P2P connection, a physical cable or wireless LAN can be connected to each printer, and thus when any printer constituting the closed network is turned on or off and newly joins or leaves the network, the closed network may be reconstituted. By reconstituting the closed network, it is easy to keep all printers, which are powered on, connected to the closed network.

E. Other Aspects (1) The present disclosure can be implemented as other aspects. For example, according to a first aspect, there is provided a printing system including: a plurality of printing devices; a common profile section having a common profile that, in a device-independent first color system, converts image data of a color space that is representable by the first color system into image data of a color space that is commonly representable by the plurality of printing devices; a first conversion section that converts first image data representing an image to be printed into second image data by using the common profile, the image being represented by the first color system; a second conversion section that converts the second image data into third image data by using an output profile, the third image data being image data of a second color system that depends on a specific printing device designated from among the plurality of printing devices, the output profile being unique to the designated specific printing device; and a print instruction section that outputs the third image data to the designated printing device to print the third image data.

In the printing system, the first image data is converted into the second image data by using the common profile performing conversion into the image data of the color space that can be commonly represented by the plurality of printing devices, the converted second image data is converted into the third image data by using the output profile unique to the printing device that performs printing, and then, the third image data is output to the printing device and printed. Therefore, even if any of the plurality of printing devices is used for printing, it is possible to achieve printing with the same color range.

(2) The printing system may further include an input conversion section that converts original image data into the first image data by using an input profile, in which the original image data is image data of an original image to be printed and being represented by a device-dependent color system, and the input profile performs conversion into the image data of the device-independent color space. In this way, even if the image to be printed is an image represented in a device-dependent color system such as RAW data of an electronic camera or sRGB, it is possible to handle the image in the same manner.

(3) In the printing system, the common profile section may obtain the common profile by acquiring a correspondence table representing a relationship between a color represented by the first color system and a color represented by the second color system for each of the plurality of printing devices coupled to the printing system, overlapping the acquired correspondence tables of the plurality of printing devices, obtaining a common color range that is commonly representable by the plurality of printing devices, and associating a color outside the common color range with a color within the common color range in the first color system. In this way, it is possible to easily obtain the common profile.

(4) The printing system may further include a designated color setting section that sets a designated color to be reproduced by printing when printing is performed by using the printing system, and the common profile section may obtain the common profile by using only a correspondence table including the designated color, among the correspondence tables of the plurality of printing devices. In this way, for a plurality of printing devices that can reproduce the designated color desired to be represented by printing, it is possible to generate a common profile, and even for any of the plurality of printing devices, it is possible to perform printing in the same color range and to represent the designated color.

(5) In the printing system, the plurality of printing devices may be connected to a common communication network in the printing system, the common profile section may be provided in a management device connected to the communication network, and the management device may include a table acquisition section that acquires the correspondence tables from the plurality of printing devices. In this way, since the management device generates the common profile, it is not necessary for each device giving a print instruction and each of the plurality of printing devices to have a configuration for generating the common profile.

(6) In the printing system, the plurality of printing devices may be coupled to each other through a predetermined path closed to an outside, at least one of the plurality of printing devices may be coupled to a computer for giving a print instruction, the common profile section may be provided in the computer or at least one of the coupled printing devices, and the common profile section may include a table acquisition section that acquires the correspondence tables from the plurality of printing devices.

When a plurality of printing devices are coupled as a printing system, an open network connection such as an intranet or an infrastructure mode wireless LAN may be used, or the printing system may be configured as a closed network connection such as P2P or ad hoc mode wireless LAN. In the former case, it is easy to increase or decrease the number of printing devices, and even if the number of printing devices is increased or decreased, the network connection can be used as it is. In the latter case, the confidentiality of the network is enhanced and it is easy to prevent intrusion from the outside.

(7) In the printing system, the printing system may transfer the first image data to the second conversion section as the second image data without performing conversion by the first conversion section, when a specific print mode is designated in which printing is performed by the specific printing device designated from among the plurality of printing devices. In this way, it is possible to cause one of the plurality of printing devices to perform printing in the original color range.

(8) As a second aspect of the present disclosure, there is provided a printing method using a plurality of printing devices constituting a network. The printing method includes: preparing a common profile that, in a device-independent first color system, converts image data of a color space that is representable by the first color system into image data of a color space that is commonly representable by the plurality of printing devices; converting first image data representing an image to be printed into second image data by using the common profile, the image being represented by the first color system; converting the second image data into third image data by using an output profile, the third image data being image data of a second color system that depends on a specific printing device designated from among the plurality of printing devices, the output profile being unique to the designated specific printing device; and outputting the third image data to the designated printing device to print the third image data. With the printing method, the first image data is converted into the second image data by using the common profile performing conversion into the image data of the color space that can be commonly represented by the plurality of printing devices, the converted second image data is converted into the third image data by using the output profile unique to the printing device that performs printing, and then, the third image data is output to the printing device and printed. Therefore, even if any of the plurality of printing devices is used for printing, it is possible to achieve printing with the same color range.

(9) In each of the above embodiments, a part of the configuration implemented by hardware may be replaced with software. At least a part of the configuration implemented by software can also be implemented by a discrete circuit configuration. Further, when some or all of the functions of the present disclosure are implemented by software, the software (computer program) can be provided in a form stored in a computer-readable recording medium. The "computer-readable recording medium" is not limited to a portable recording medium such as a flexible disk or a CD-ROM, and includes various internal storage devices such as RAM and ROM in the computer, and external storage devices fixed to the computer such as a hard disk. That is, the "computer-readable recording medium" has a broad meaning including any recording medium on which a data packet can be fixed not temporarily. The printing device is not limited to an ink jet printer, and includes a color laser printer, a sublimation type color printer, a textile printing printer, a multicolor plotter, or the like.

The present disclosure is not limited to the above-described embodiments, and can be implemented with various configurations without departing from the spirit thereof. For example, the technical features in the embodiments corresponding to the technical features in each mode described in the "SUMMARY" section can be appropriately replaced or combined in order to solve some or all of the above-mentioned problems, or to achieve some or all of the above effects. When the technical features are not described as essential in this specification, they can be deleted as appropriate.

What is claimed is:

1. A printing system comprising:
   a plurality of printing devices;
   a common profile section having a common profile that, in a device-independent first color system, converts image data of a color space that is representable by the first color system into image data of a color space that is commonly representable by the plurality of printing devices;
   a first conversion section that converts first image data representing an image to be printed into second image data by using the common profile, the image being represented by the first color system;
   a second conversion section that converts the second image data into third image data by using an output profile, the third image data being image data of a second color system that depends on a specific printing device designated from among the plurality of printing devices, the output profile being unique to the designated specific printing device; and
   a print instruction section that outputs the third image data to the designated specific printing device to print the third image data.

2. The printing system according to claim 1, further comprising:
   an input conversion section that converts original image data into the first image data by using an input profile, the original image data being image data of an original image to be printed and being represented by a device-dependent color system, the input profile performing conversion into image data of a device-independent color space.

3. The printing system according to claim 1, wherein
   the common profile section obtains the common profile by acquiring a correspondence table representing a relationship between a color represented by the first color system and a color represented by the second color system for each of the plurality of printing devices coupled to the printing system, overlapping the acquired correspondence tables of the plurality of printing devices, obtaining a common color range that is commonly representable by the plurality of printing devices, and associating a color outside the common color range with a color within the common color range in the first color system.

4. The printing system according to claim 3, further comprising:
   a designated color setting section that sets a designated color to be reproduced by printing when printing is performed by using the printing system, wherein
   the common profile section obtains the common profile by using only a correspondence table including the designated color, among the correspondence tables of the plurality of printing devices.

5. The printing system according to claim 3, wherein the plurality of printing devices are connected to a common communication network in the printing system, the common profile section is provided in a management device connected to the communication network, and the management device includes a table acquisition section that acquires the correspondence tables from the plurality of printing devices.

6. The printing system according to claim 3, wherein the plurality of printing devices are coupled to each other through a predetermined path closed to an outside, at least one of the plurality of printing devices is coupled to a computer for giving a print instruction, the common profile section is provided in the computer or at least one of the coupled printing devices, and the common profile section includes a table acquisition section that acquires the correspondence tables from the plurality of printing devices.

7. The printing system according to claim 1, wherein the printing system transfers the first image data to the second conversion section as the second image data without performing conversion by the first conversion section, when a specific print mode is designated in which printing is performed by the specific printing device designated from among the plurality of printing devices.

8. A printing method using a plurality of printing devices constituting a network, the printing method comprising:
preparing a common profile that, in a device-independent first color system, converts image data of a color space that is representable by the first color system into image data of a color space that is commonly representable by the plurality of printing devices;
converting first image data representing an image to be printed into second image data by using the common profile, the image being represented by the first color system;
converting the second image data into third image data by using an output profile, the third image data being image data of a second color system that depends on a specific printing device designated from among the plurality of printing devices, the output profile being unique to the designated specific printing device; and
outputting the third image data to the designated specific printing device to print the third image data.

* * * * *